United States Patent [19]

Uetsuhara

[11] Patent Number: 4,541,563
[45] Date of Patent: Sep. 17, 1985

[54] ELECTRONIC VALVE CONTROL APPARATUS

[75] Inventor: Tokio Uetsuhara, Urawa, Japan

[73] Assignee: Mitsubishi Mining & Cement Co., Ltd., Tokyo, Japan

[21] Appl. No.: 523,689

[22] Filed: Aug. 16, 1983

[30] Foreign Application Priority Data

Aug. 25, 1982 [JP] Japan .............................. 57-127407[U]

[51] Int. Cl.[4] .............................................. A01G 25/16
[52] U.S. Cl. ................................... 239/64; 137/624.2; 239/69; 239/71
[58] Field of Search .................. 239/63, 64, 67, 69–71; 137/624.11, 624.2

[56] References Cited

U.S. PATENT DOCUMENTS

| | | | |
|---|---|---|---|
| 3,777,976 | 12/1973 | Milovancevic | 239/64 X |
| 3,869,854 | 3/1975 | Church | 137/624.2 X |
| 4,190,884 | 2/1980 | Medina | 239/63 X |
| 4,232,707 | 11/1980 | Sturman et al. | 239/70 X |
| 4,256,133 | 3/1981 | Coward et al. | 239/64 X |
| 4,304,989 | 12/1981 | Vos et al. | 239/63 X |

Primary Examiner—Andres Kashnikow
Attorney, Agent, or Firm—Bierman, Peroff & Muserlian

[57] ABSTRACT

An electronic valve control apparatus for operating a valve device connected to a water supply pipeline for spraying water over the field or land comprising: a solar battery; a secondary battery charged therefrom; an electronic clock; a calendar circuit; a logic circuit which delivers output valve control signals in response to a predetermined schedule; and a valve driving circuit which controls the valve device.

2 Claims, 4 Drawing Figures

ELECTRONIC VALVE CONTROL APPARATUS

BACKGROUND OF THE INVENTION

The present invention relates to an electronic valve control apparatus, and more particularly relates to control apparatuses that are used to control a plurality of electromotive or electromagnetic valve devices which are respectively installed at considerable distances from a power source for driving the valve devices.

To date, large scale sprinkler irrigation systems for spraying water over the fields have been employed mainly for plantations, orchards, golf links and the like. Such irrigation systems provide water supply pipelines for supplying irrigation water or desired liquid solutions containing insecticide or fertilizer under pressure to affect plant or lawn growth. The water or solution is distributed by operation of valve devices that are mounted to the pipelines for fluid flow control.

Generally such sprinkler irrigation systems consist of a central remote control station and long electric power supply lines connecting the control station to electromotive or electromagnetic valve devices which are arranged in the water supply pipelines.

Regulation of the valve devices is done through the remote control in response to the predetermined sprinkler time schedules respectively preset in the control system by way of the electric power supply lines.

As a prior sprinkler irrigation system, Kah, Jr. U.S. Pat. No. 3,747,620 teaches a line pressure variation control system, which requires, in the case of control for large numbers of valves provided therein, a plurality of pumps mounted to various sites beside the pipeline. In addition, electric power supply lines for the driving of the pumps and the monitoring of the water pressure distribution in the pipeline network are required.

Milovancevic U.S. Pat. No. 3,777,976 discloses electronically controlled watering system providing a solid state electronic control system therein with a programing function. This system employs an external electric power source with an electric power supply line for valve operation.

The conventional valve control system with a remote control station requires, as above described, long power supply lines connecting the remote control station with electromotive or electromagnetic valve devices.

Therefore, it has several disadvantages including those of high initial capital cost and possible damage by lightening.

OBJECTS OF THE INVENTION

An object of the present invention is to provide a low cost valve control apparatus that eliminates the need for a central remote control station and electric power supply lines.

Another object of the present invention is to provide a valve control apparatus which prevents possible damage of lightening and other problems possibly related to having electric power supply lines.

A further object of the present invention is to provide a valve control apparatus which can be energized by a solar battery as its electric power source.

A still further object of the present invention is to provide a valve control apparatus which is economic, compact, simple, reliable and easy for transportation, installation, operation and maintenance.

Another object of the present invention is to provide a valve control apparatus which is controlled in response to a predetermined time schedule set by an operator based on his direct observation of each local area to be sprinkled.

To achieve each of these objects as well as certain other advantageous features, according to the present invention, a valve control apparatus may be built in a small casing and located adjacent to the particular valve device to be controlled. The valve control apparatus includes a power source composed of a solar battery, a secondary battery charged therefrom and electronic circuits which are adapted for feeding suitable signals to the valve devices in response to the predetermined program.

DETAILED DESCRIPTION

Figure 1:
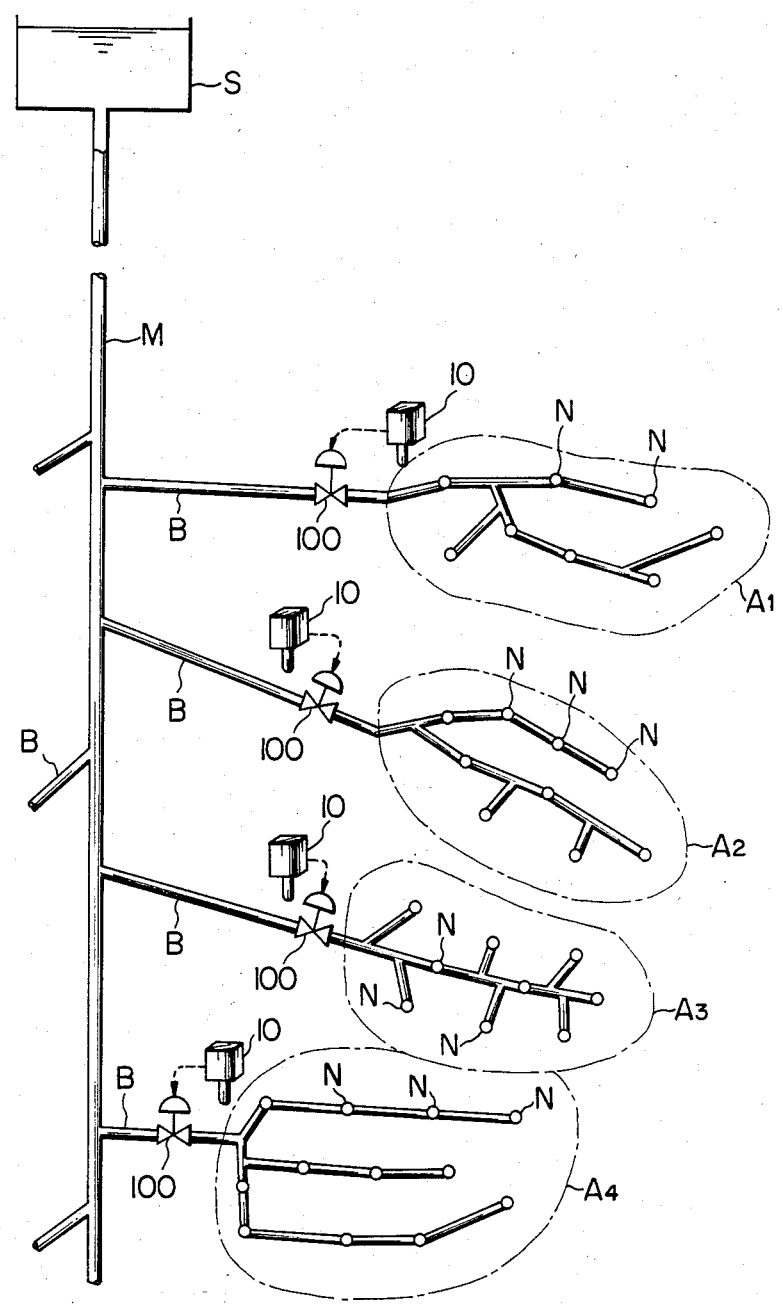
FIG. 1 illustrates a schematic system diagram of a sprinkler irrigation system that is provided with preferable embodiments of the valve control apparatus of the present invention.

Refer to FIG. 1 for the schematic system diagram of the sprinkler irrigation system. The system comprises water source S, trunk M which supplies water or chemical solution under pressure in natural head or modified head by a pump (not shown) from source S to branch pipes B. In addition, the system comprises valve devices designated 100, one of which is mounted to each branch pipe B, and a plurality of sprinklers N installed at each end part of the branch pipes. The sprinkling areas are suitably divided into A1, A2, A3, A4, etc.

The present invention provides valve control apparatus 10 adjacent to each valve 100 respectively.

Figure 2:
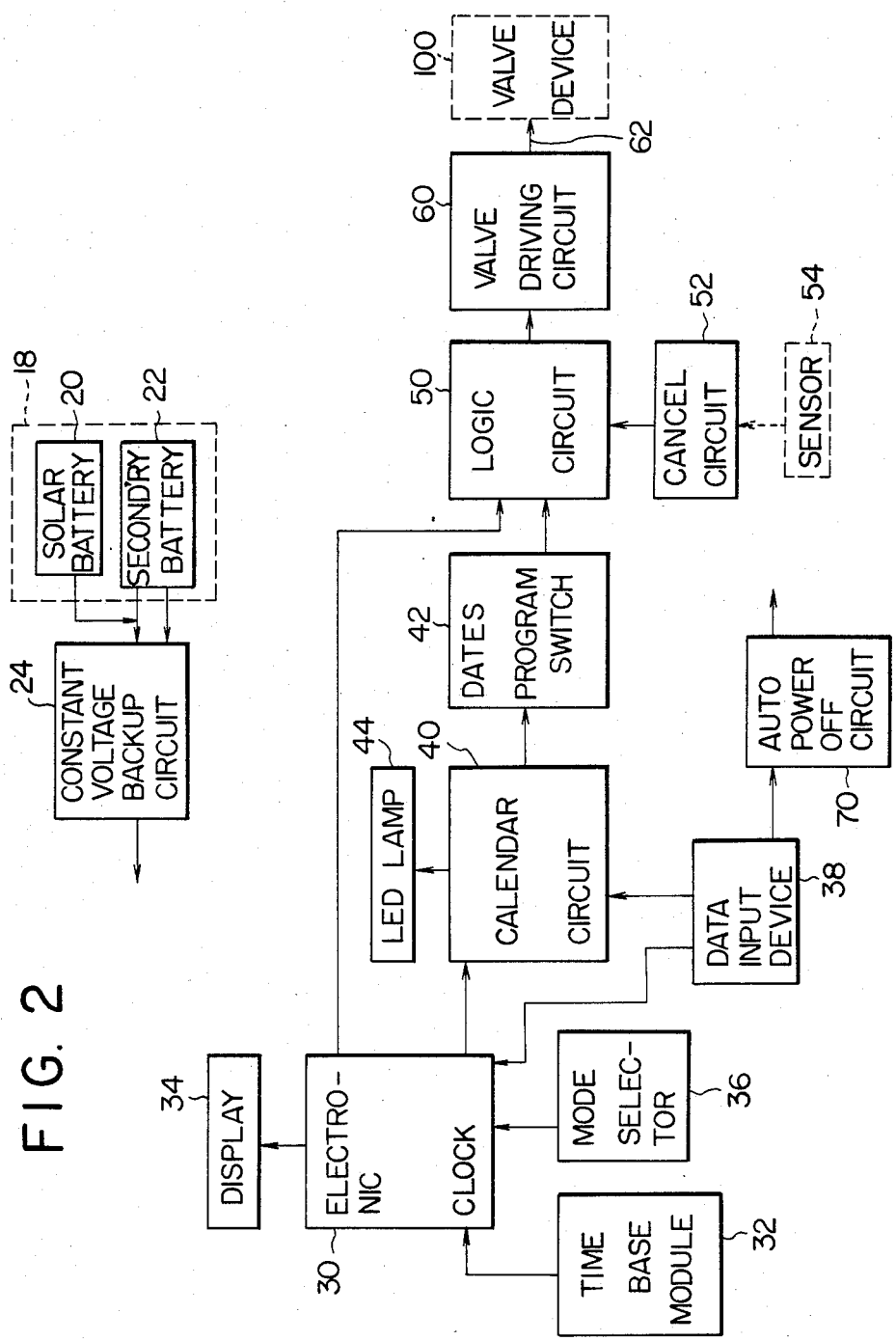
FIG. 2 is a schematic block diagram of an embodiment of the valve control apparatus of the invention.

As shown in FIG. 2, valve control apparatus 10 of the present invention comprises electric power source circuit 18 which consists of solar battery 20 and secondary battery 22, electronic clock 30, calendar circuit 40, logic circuit 50 and valve driving circuit 60.

Solar battery 20 is of a conventional type that, for example, has 12 V, 1 W characteristics and is composed of an array of 24 silicon p-n junction solar cells, connected in parallel and series. A solar cell can convert photons of light energy from the sun directly and efficiently into electric energy.

Solar battery 20 may feed electric energy to the electronic clock and other circuits and, in addition, charge secondary battery 22 which is provided as a storage power source.

Secondary battery 22 itself is a conventional secondary type battery, for example, of 12 V, 6 AH in capacity.

Power source circuit 18 may be connected to a constant voltage backup circuit designated 24 which has a function to stabilize the output voltage from power source circuit 18, to respective parts of the control apparatus and to the valve device to be operated.

Electronic clock 30 moves stepwise, being fed base time by time base module 32. The clock may deliver output time pulse signals which indicate the passage of time as the input of logic circuit 50 and also may deliver output valve operation time schedules preset within itself to calendar circuit 40.

Electronic clock 30 has display 34 and mode selector 36.

Display 34 electronically represents digital time indication, receiving for instance decoded signals of 6 segments supplied from electronic clock 30.

Mode selector 36 is a mode converting mechanism which is manually operated to change the mode of electronic clock 30 into that of either actual time, valve opening time or valve closing time. The time indication of either mode is represented on display 34 in response to the set position of mode selector 36. In the particular selected mode, optional times within 24 hours can be adjusted using data input device 38 attached to clock 30. The valve operation schedule is determined with a set of a valve opening time and a closing time. It is possible to set more than one set of times such as, for example, the operation schedules of a valve device in both the morning and the evening.

The particular valve operation schedules are determined in accordance with the operator's direct observation of the area to be sprinkled.

Calendar circuit 40 counts units of days and delivers output signals of the valve operation times fed from electronic clock 30 to logic circuit 50 when one of the preset dates in dates program switch 42 attached thereto coincides with the actual date.

Dates program switch 42 provides seven push buttons corresponding to Sunday through Saturday. On setting the dates, the current calendar date is set with data input device 38, and then optionally selected dates within the next seven days are set with dates program switch 42. LED lamps show the set dates respectively.

Logic circuit 50 compares the actual time input from electronic clock 30 with the valve operation times fed from calendar circuit 40, and when the actual time input coincides with the latter derived information, an output signal is delivered by logic circuit 50 to valve driving circuit 60. This action allows the valve driving power from electric power source 18 to be fed to valve device 100.

In a variety of reasons it may be required to stop sprinkling. To this end, according to the present invention, logic circuit 50 provides cancel circuit 52 which preferably cancels the output signal of logic circuit 50 due to an information from an attached sensing device 54.

Valve driving circuit 60 delivers an output of the valve driving power from power source 18 to valve device 100 through outlet terminal 62, in accordance with the actuating signal fed from logic circuit 50.

Furthermore, the valve control apparatus of the present invention may provide auto power off circuit 70 which interlocks between circuits as needed, minimizes noise and turns off displays and lamps shortly after operator's adjustment of set times etc. to minimize energy wastage.

Figure 3:
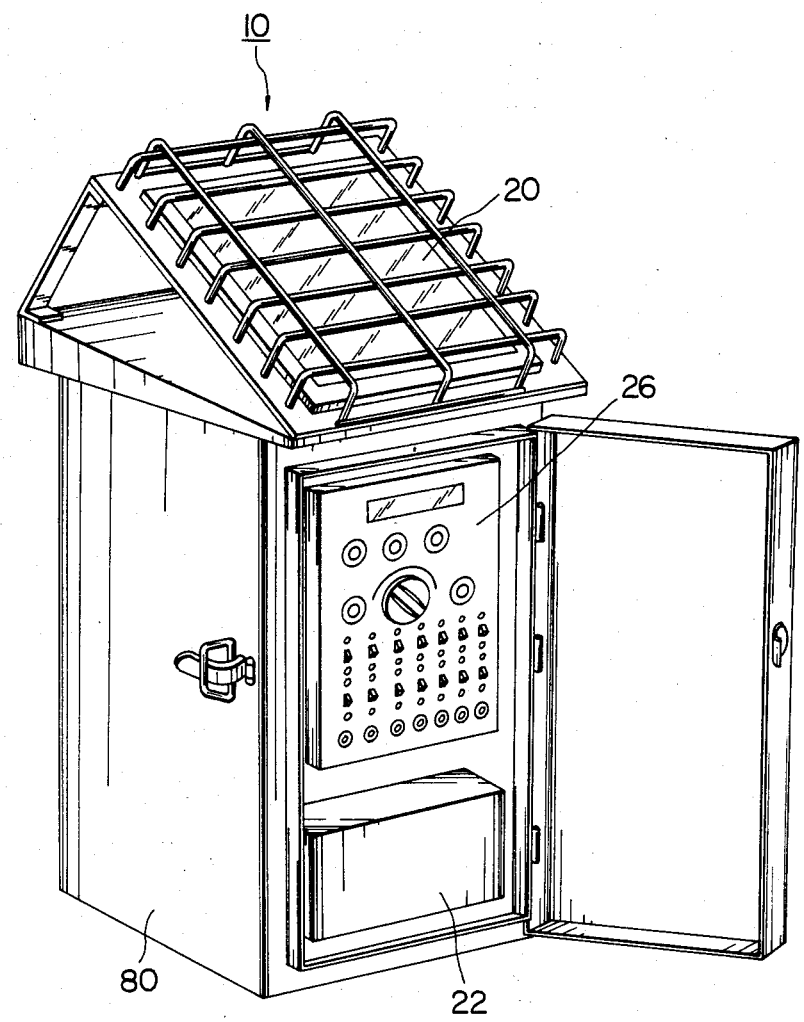
FIG. 3 is a perspective view of an embodiment of a control apparatus.

According to the present invention, the valve control apparatus can be housed into casing 80 which can be placed adjacent to the valve device. Solar battery 20 may be mounted on the exterior of the casing. FIG. 3 shows an embodiment of such a unit with the front door open, in which electronic process panel 26 can be seen.

For controlling a plurality of valve devices in close vicinity, a plurality of circuits each consisting of a clock, a calendar circuit, a logic circuit and a valve driving circuit can be provided in the casing with one common power source.

As a valve device to be controlled by means of the valve control apparatus according to the present invention, it is preferable to use an electromotive ball valve with a rotating electric motor which works with small power consumption under minimum current of low potential, for instance, at 12 V, 4 W, 20 seconds of opening duration, and it is more preferable to employ an electromagnetic valve device driven by an electric pulse because the power consumption of this will be further smaller. For example, it works at 12 V, 0.1 A, 20-50 milliseconds of operating time.

Figure 4:
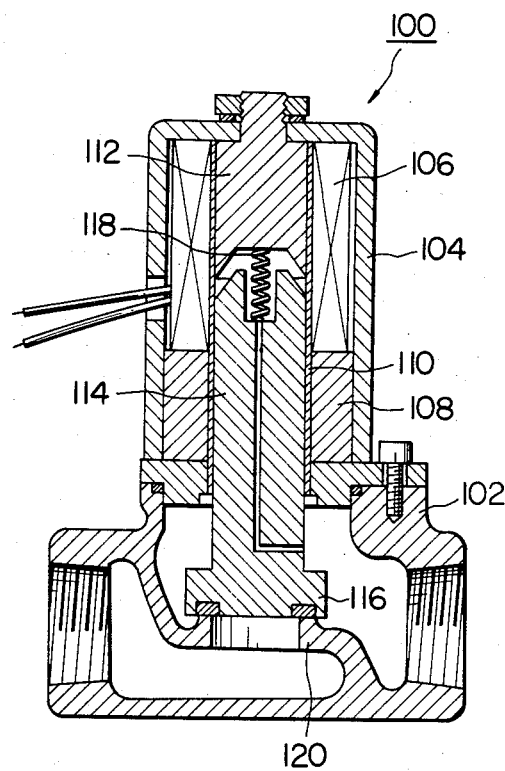
FIG. 4 is a cross sectional view of an optimum embodiment of an electromagnetic valve device that is driven by an electric pulse of minimum power.

FIG. 4 shows such a preferable electromagnetic valve device, in which hollow cylindrical casing 104 of ferromagnetic substance is fixed on the upper part of the valve housing 102, and inside hollow cylindrical casing 104, electromagnetic solenoid 106 and cylindrical permanent magnet 108 lie in series and constitute a common magnetic field. Inside of this magnetic field fixed core 112 and movable core 114 are lined up with nonmagnetic guide lining pipe 110. Movable core 114 is fixed to valve body 116 which is in turn pressed against valve seat 120 by biasing spring 118 to keep the valve device in a closed state.

When valve body 116 of valve device 100 is to be opened so that fluid can pass through it, an electric pulse is fed to solenoid 106 to energize it instantaneously. Consequently, fixed core 112 pulls movable core 114 up to contact it. Movable core 114 keeps contact with fixed core 112 without any additional excitation energy being supplied to solenoid 106 once movable core 114 comes in to the contact position with fixed core 112. This is because the magnetic circuit which is closed by passing through hollow cylindrical casing 104, fixed core 112 and movable core 114 functions to keep the position. As a result, only a pulse of minimum current at low potential initially applied to solenoid 106 will be required to operate the opening of valve body 116, and the opened position will thus be maintained without the need for any additional power input.

For the closing operation of valve device 100, an electric pulse of reverse polarity is supplied to solenoid 106. As this happens, the magnetic force of permanent magnet 108 which is keeping moving core 114 in contact with fixed core 112 becomes counteracted by the instantaneous reverse energization of solenoid 106, and so the resilient force of biasing spring 118 overcomes the magnetic power of permanent magnet 108 and causes movable core 114 to slide downwards. As a result valve body 116 touches valve seat 120 and closes the water path.

It is thus apparent why the power consumption of the above described valve device is very small, because only the instantaneous pulse at the moment of initial operation is required and not any more.

Having described the present invention as related mainly to a preferable embodiment, it is my intention that the invention be not limited by any of the details of description, but rather be constructed broadly within the spirit and scope of the invention as set out in the following claims.

What is claimed is:

1. In a valve control system including at least one valve device connected to a supply source of fluid under pressure and a control apparatus to operate the valve device, an improved control apparatus comprising:
- an electronic clock which delivers output time pulse signals indicating the passage of time to a logic circuit and delivers output signals of valve operation time schedules preset in itself to a calendar circuit;
- a calendar circuit which counts units of days and delivers output signals of valve operation times on the preset days to a logic circuit;
- a logic circuit which compares the time pulse signals from said electronic clock with the input signals from said calendar circuit and when they coincide delivers output actuating signals to a valve driving circuit;
- means for setting sprinkling time schedule on desired days arranged manually according to direct observation of the area to be sprinkled;
- a cancel circuit which cancels the preset sprinkling current time schedule according to a signal from a rain sensor;
- an automatic power off circuit which automatically turns off check signal lamps and displays to save energy;
- a valve driving circuit which is actuated by said logic circuit and controls the valve device; and
- an electric power source circuit consisting of a solar battery and a secondary battery, which supplies electricity to said electronic clock, said calendar circuit, said logic circuit, said cancel circuit, said automatic power off circuit, said valve driving circuit and a valve device that is to be operated.

2. In a valve control system as claimed in claim 1, said valve control apparatus comprises a standing casing in which said electronic clock, said calendar circuit, said logic circuit, said cancel circuit, said automatic power off circuit, said valve driving circuit and said secondary battery are housed inside, and on the exterior of which said solar battery is installed,
  whereby sprinkling schedules presetting facility sand effective absorption of solar energy may be achieved.

* * * * *